US009026091B2

(12) United States Patent
Howerton

(10) Patent No.: US 9,026,091 B2
(45) Date of Patent: *May 5, 2015

(54) ON-DEMAND, REAL-TIME INTERPRETATION SYSTEM AND METHOD

(71) Applicant: Real Time Translation, Inc., Chaska, MN (US)

(72) Inventor: Charles S. Howerton, Ventura, CA (US)

(73) Assignee: Real Time Translation, Inc., Chaska, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/925,759

(22) Filed: Jun. 24, 2013

(65) Prior Publication Data
US 2013/0288650 A1    Oct. 31, 2013

Related U.S. Application Data

(63) Continuation of application No. 12/738,941, filed as application No. PCT/US2008/080930 on Oct. 23, 2008, now Pat. No. 8,472,925.

(60) Provisional application No. 60/981,919, filed on Oct. 23, 2007.

(51) Int. Cl.
H04M 3/42         (2006.01)
H04W 4/16        (2009.01)
H04M 1/60         (2006.01)
G06F 17/28        (2006.01)

(52) U.S. Cl.
CPC .............. H04W 4/16 (2013.01); H04M 1/6066 (2013.01); G06F 17/28 (2013.01)

(58) Field of Classification Search
CPC ........... H04M 3/42; H04M 4/12; H04L 12/56
USPC ........ 455/414.1, 90.2, 550.1, 569.1; 704/9, 2, 704/3; 379/67.1, 387.01, 265.02, 202.01; 348/14.02; 370/252, 331
See application file for complete search history.

(56) References Cited

U.S. PATENT DOCUMENTS

| 2002/0181669 | A1* | 12/2002 | Takatori et al. | 379/88.06 |
| 2006/0165225 | A1* | 7/2006 | Sahashi | 379/67.1 |
| 2007/0050306 | A1* | 3/2007 | McQueen | 705/77 |
| 2007/0239625 | A1* | 10/2007 | Sterns et al. | 705/400 |
| 2010/0066803 | A1* | 3/2010 | Robotka | 348/14.02 |

* cited by examiner

Primary Examiner — Kiet Doan
(74) Attorney, Agent, or Firm — Thomas J. Oppold; Larkin Hoffman Daly & Lindgren, Ltd.

(57) ABSTRACT

A system and method for on-demand, real-time interpretation services. The system includes a mobile hands-free communicator that cooperates with a two-way radio frequency communication device. The hands-free communicator includes a unique identifier that is operably associated with the user. An initiation protocol enables the user to request interpretation services using the hands-free communicator.

25 Claims, 9 Drawing Sheets

Two-Way Proximity Communication Mode

Two-Way Proximity Communication Mode

Observation Mode

Two-Way Remote Communication Mode

ON-DEMAND, REAL-TIME INTERPRETATION SYSTEM AND METHOD

CROSS-REFERENCE TO RELATED APPLICATIONS

This is a continuation of U.S. patent application Ser. No. 12/738,941, filed Apr. 4, 2010, now U.S. Pat. No. 8,472,925, which claims the benefit of International Patent Application No. PCT/US2008/080930, filed Oct. 23, 2008, which claims the benefit of U.S. Provisional Application No. 60/981,919, filed Oct. 23, 2007.

BACKGROUND

The use of interpreters to facilitate communication between persons speaking different languages has been a common practice from the time different cultures first began interacting for purposes of trade and exploration. With the comparatively recent invention of the telephone, interpretation services have also been provided telephonically where the interpreter and the persons desiring to communicate are all located remotely from one another. Through the use of mobile or wireless telephones, interpretation services are capable of being provided from virtually anywhere in the world and at any time. Furthermore, with the utilization of Bluetooth® technology, Radio Frequency (RF) technology and wireless headsets, hands-free communication between the parties and the interpreter are now possible.

While interpretation services and the technology capable of permitting interpretation services among remote parties has been available for years, and while RF and Bluetooth technology is well known to permit hands-free wireless communication, heretofore, there has never been a system and method available that enables a user utilizing his/her existing conventional mobile telephone service or other two-way RF communication service to request and receive interpretation services on-demand and in real-time, from virtually anywhere in the world.

DETAILED DESCRIPTION

Figure 1:
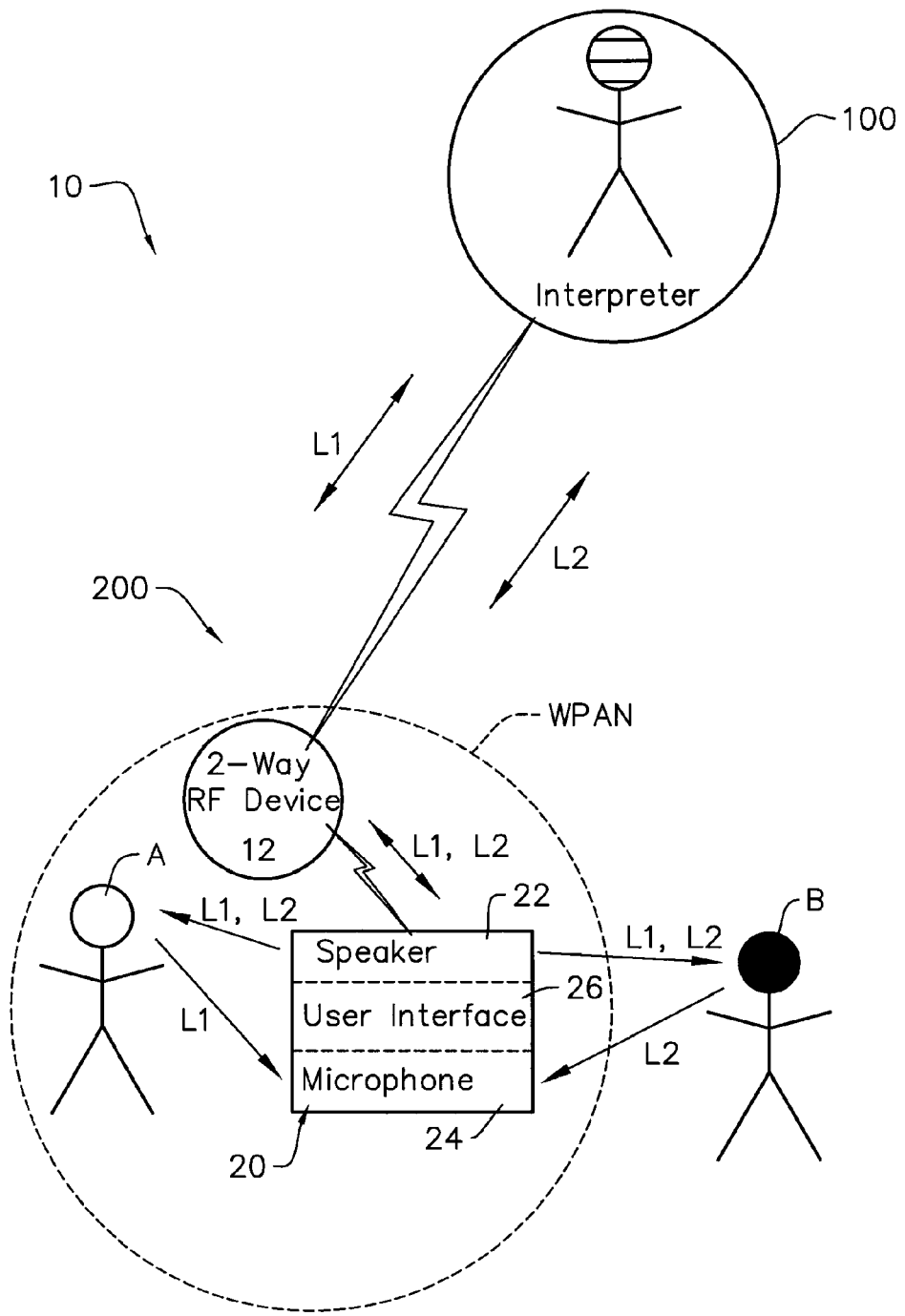
FIG. 1 is a schematic illustration of a mode of use of an embodiment of the system and method of the present invention.
Figure 2:
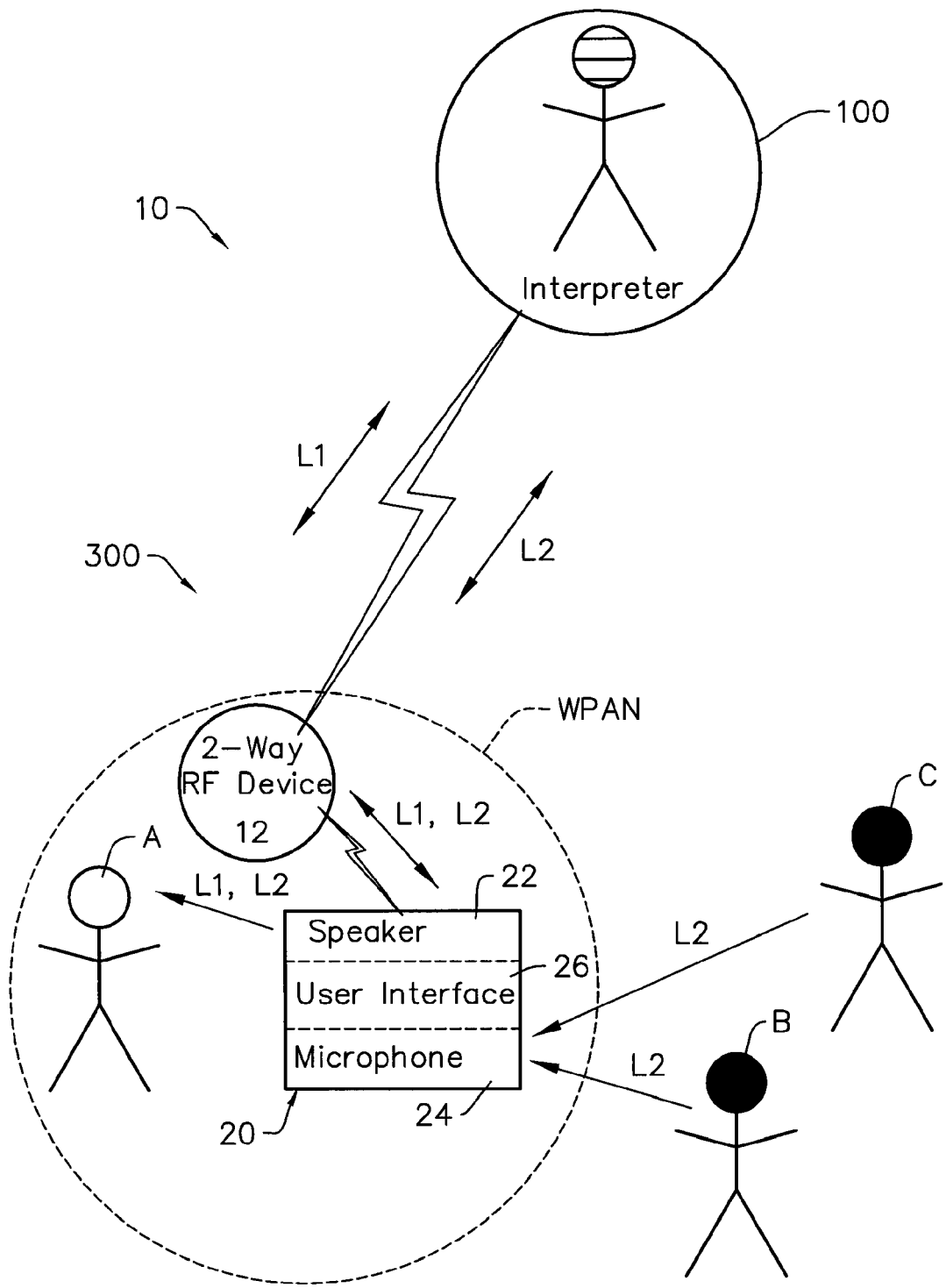
FIG. 2 is a schematic illustration of another mode of use of an embodiment of the system and method of the present invention.
Figure 3:
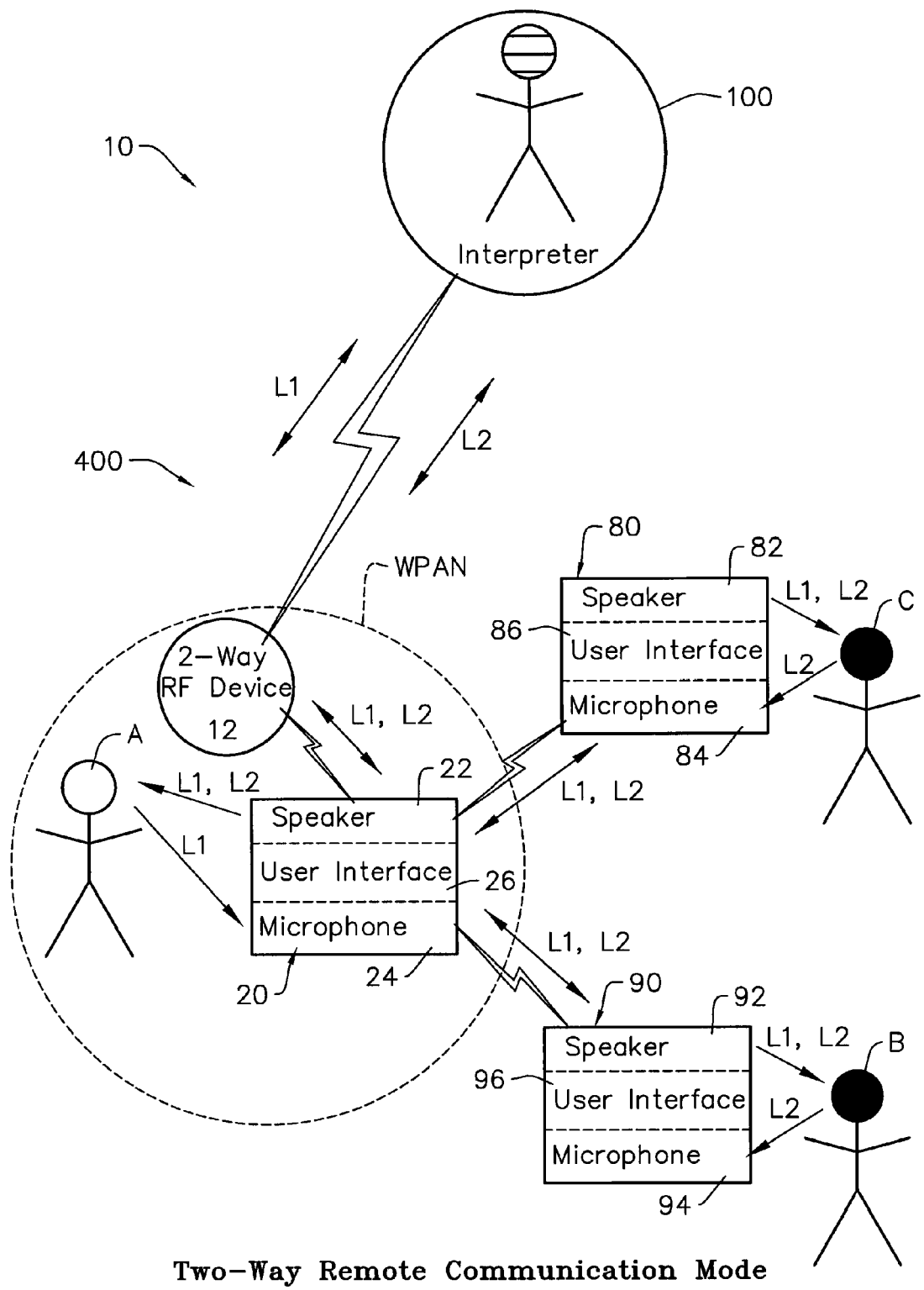
FIG. 3 is a schematic illustration of another mode of use of an embodiment of the system and method of the present invention.

Referring now to the drawings, wherein like reference numerals designate identical or corresponding parts throughout the several views, FIGS. 1-3 illustrate various embodiments of the system and method 10 of the present invention, or, more accurately, FIGS. 1-3 represent different "modes" in which the system and method 10 of the present invention may be utilized.

As schematically illustrated in each of the various modes, a first person "A" speaks a first language "L1" and a second person "B" speaks a second language "L2" such that an interpreter, who speaks both languages L1 and L2, is needed to facilitate communication between persons A and B or to otherwise interpret the communications between persons B and C (both speaking the second language L2) into the first language L1 for the benefit of person A.

The interpreter is shown to be remote from persons A, B and C. The interpreter may be an individual previously arranged by person A to provide interpretation services, or the interpreter may be a call center that employs, or contracts with, individual interpreters to whom calls are forwarded based on availability and the languages for which interpretation services are needed. The individual interpreter and/or call center having individual interpreters are hereinafter referred to, collectively and/or individually, as "interpretation service provider" or simply "provider" or "interpreter" unless otherwise designated.

Furthermore, with respect to each of the modes or embodiments of FIGS. 1-3, person A is presumed to have a two-way RF communication device, such as a two-way radio, mobile telephone or some other device for wireless two-way communication (hereinafter referred to as a "2-way RF device 12") for calling and communicating with the remote interpreter. Preferably the 2-way RF device 12 includes, or is adapted to cooperate with, a wireless personal area network (WPAN) transceiver for reasons discussed later.

As used herein, a WPAN (also commonly known or referred to as a "scatter-net," "piconet" or "multi-hop ad-hoc network") should be understood to include any wireless technology such as Bluetooth, RF, ZigBee or other currently known or later developed wireless technology for networking or interconnecting devices in relative close proximity to one another (e.g., typically less than ten meters) to enable communication therebetween.

Continuing to refer to the modes or embodiments of FIGS. 1-3, the system and method 10 further includes a wireless hands-free communicator 20. The wireless hands-free communicator 20 preferably includes a speaker 22, a microphone 24, a user interface 26, and a WPAN transceiver for communication with the WPAN transceiver of the 2-way RF device 12. The hands-free communicator 20 may be separate from the 2-way RF device as illustrated in the drawing figures, or, alternatively, the hands-free communicator 20 and 2-way RF device 12 may comprise a single integral unit (not shown).

The microphone 24 is preferably a directional microphone to minimize signal-to-noise ratio and improve speech clarity. However, under certain conditions, an omni-directional microphone may be suitable to permit hearing in all directions. Additionally, it may be desirable to provide both an omni-directional microphone and a directional microphone to enable person A to switch between hearing in all directions versus hearing primarily in only one direction as circumstances or surroundings dictate.

The user interface 26 preferably includes or incorporates an on/off switch 30, a call connect/disconnect feature 32, and speaker volume control 34 and a speaker mute feature 36. Depending on the application and circumstances under which the system and method 10 is being used, the foregoing features may be actuated by hand or by voice. For hand actuation, push buttons or other suitable switches or dials, or pressure, heat or light sensitive pads or membranes or even non-contact sensors (e.g., infrared motion sensors, etc.) may be utilized to provide the foregoing features and functionalities. Furthermore, as discussed below, the user interface 26 may be divided among separate components that together constitute the hands-free communicator 20, such as, for example, the combination of the pendant and headset discussed below.

Figure 4A:
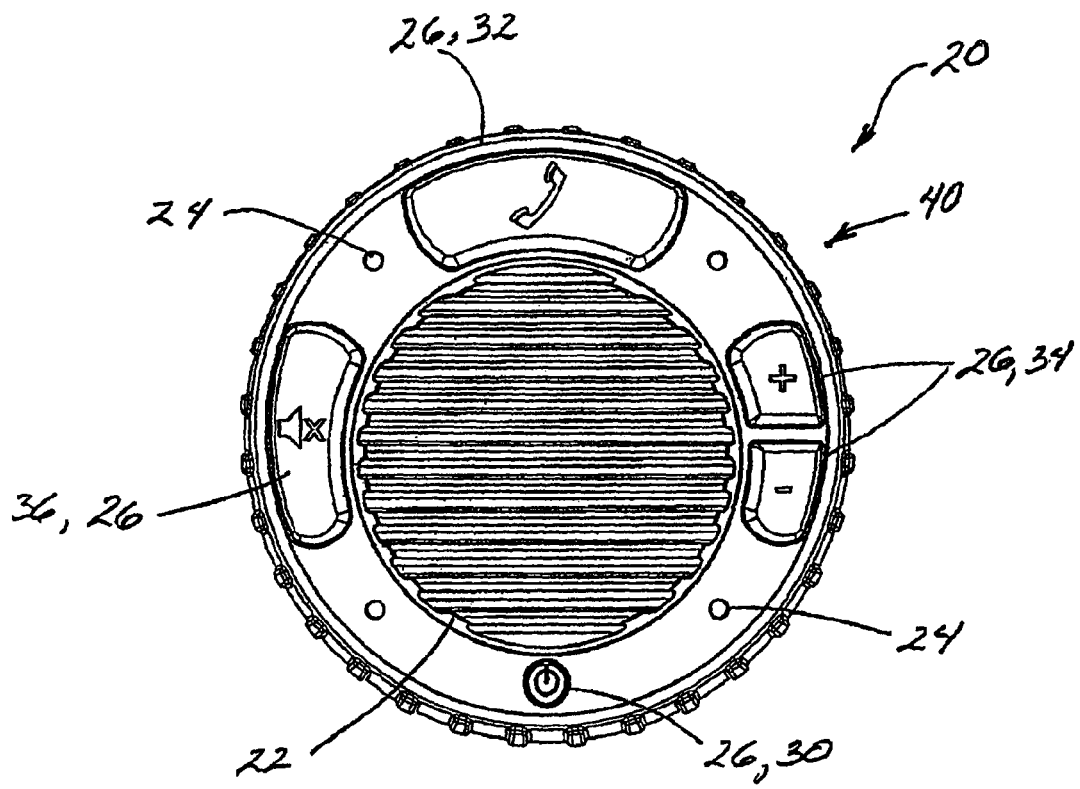
FIGS. 4A-4B illustrate an embodiment of a pendant style hands-free communicator for use in connection with the system and method of FIG. 1, 2 or 3.
Figure 4B:
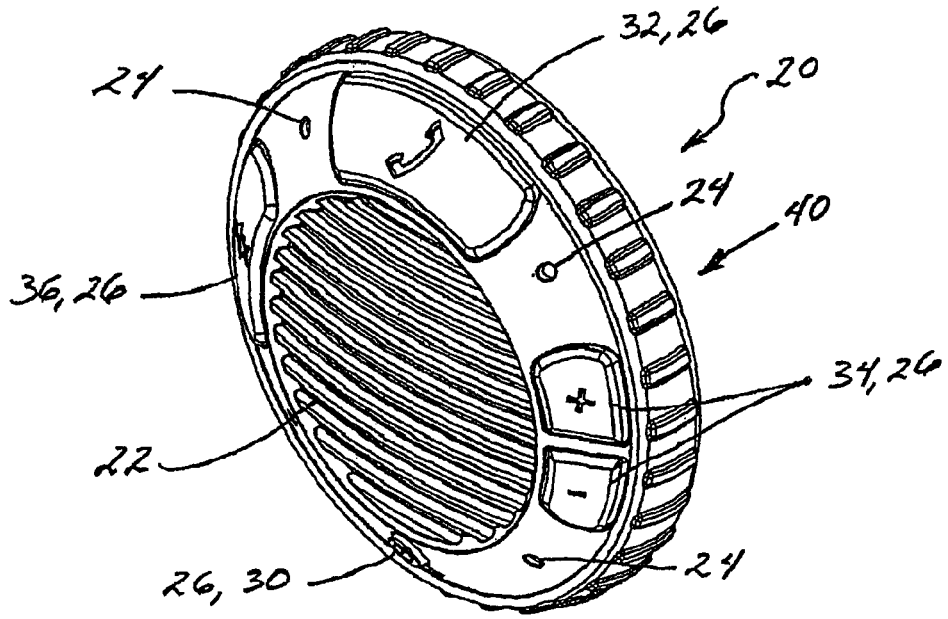

Depending on the circumstances under which the system and method 10 of the present invention is being used, the hands-free communicator 20 may take the form of a pendant 40 (FIGS. 4A-4B) to be worn or carried by person A. In a preferred embodiment, the pendant 40 includes a clip 42 for clipping onto person A's clothing or over an arm or wristband, etc. Additionally, the pendant embodiment may include Velcro® strips (not shown) for fastening the pendant to person A's clothes, arm or wrist. The pendant 40 also preferably includes hooks, apertures or other supports 44 for receiving a lanyard 46 for hanging the pendant 40 from person A's neck. It should be appreciated that the pendant 40 is particularly suited for use in situations in which persons A and B are in mobile indoor or outdoor situations, but may be equally suitable in any other setting, including, for example, in substantially stationary table-top or wall mounted applications. Furthermore, the pendant 40 may incorporate a video camera to permit the interpreter to view persons B and/or C. Additionally, the pendant 40 may include a video screen thereby permitting persons B and/or C to view the interpreter.

Figure 5:
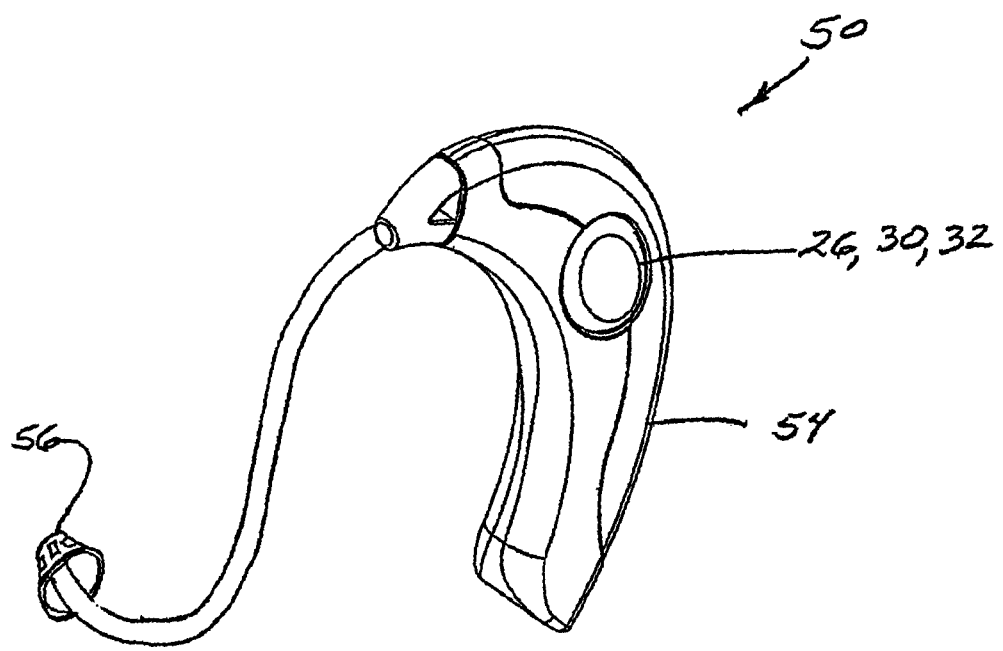
FIG. 5 illustrates an embodiment of a headset style hands-free communicator for use in connection with the system and method of FIG. 1, 2 or 3.

In yet another embodiment of the hands-free communicator 20 as illustrated in FIG. 5, the hands-free communicator 20 may include and cooperate with a headset 50. The headset 50 may incorporate one or more of the above-described features of the user interface 26, for example the on/off switch, the call connect/disconnect feature, etc. The headset 50 also preferably includes a WPAN transceiver 52 to enable wireless communication between the headset 50 and the pendant 40. In the preferred embodiment, the headset 50 includes a behind-the-ear (BTE) component 54 and a within-the-ear (WTE) component 56. The BTE component 54 preferably houses the transceiver 52 and other electrical components required to communicate with the pendant 40. In this manner, the voice communications are transmitted from the pendant 40 to the wireless transceiver 52 within the BTE component 54 of the headset 50, which then communicates the sound to the WTE component 56 into the wearer's ear via a flexible acoustical tube 58. Alternatively, rather than an acoustical tube, sound may be provided to the ear electrically via a wire and miniature speaker placed in the ear canal. The headset 50 is particularly adapted for use in applications or situations where person A wishes to listen in on the communications between person B and another person C without the knowledge of person B and/or person C or in environments where it would be difficult for person A to hear the interpreter over the broadcast speaker of the pendant 40. Like the pendant 40, the headset 50 may also incorporate a video camera to permit the interpreter to view persons B and/or C.

In yet another embodiment of the hands-free communicator 20, a headset 60 (FIG. 9) may alone constitute the hands-free communicator 20. In this embodiment, the headset 60 may be substantially identical to that of the headset 50, except that the BTE component of the headset 60 may also include the microphone 24 along with other desired features of the user interface 26. As with the headset 50, the headset 60 is particularly adapted for use in applications or situations where person A wishes to listen in on the communications between person B and another person C without the knowledge of person B and/or person C or in environments where it would be difficult for person A to hear the interpreter over the broadcast speaker of the pendant 40.

In yet another embodiment, a remote user headset 80 (FIG. 10) may be provided that is substantially identical to the headset 50. A remote user headset 80 would be useful to facilitate two-way communications where person B is sufficiently remote from person A such that person B is unable to clearly hear the interpreter's words through the speaker 22 on the pendant 40 or where noise prevents persons B from clearly hearing the interpreter through the speaker 22 of the pendant 40. In use, the remote user headset 80 communicates with the hands-free communicator 20 of person A via RF communication. Depending on the distances over which person A must communicate with person B, a transmitter may be necessary to extend the range of the RF communication. The transmitter may have a separate power supply and could reside in a vehicle, trailer or other facility.

In yet another embodiment, a remote user pendant 90 (FIG. 10) may be utilized instead of a remote user headset 80 or in combination with a remote user headset 80. The remote user pendent 90 is preferably substantially identical to the pendant 40 except that the remote user pendant 90 does not include a call initiation or call drop feature since it does not communicate directly with the 2-way RF device 12. Instead, the remote user pendant 90 communicates with the hands-free communicator 20 of person A via RF communication. The remote user pendant 90 may include a WPAN transceiver for communication with a headset 80 as previously described. As with the remote user headset 80 embodiment, a transmitter may be used to extend the range of the RF communication of the remote user pendant 90. The transmitter may have a separate power supply and could reside in a vehicle, trailer or other facility.

Initial Registration:

In the preferred system and method 10, person A must first register to receive interpretation services from a provider 100 of the interpretation services. The provider 100 may be an individual interpreter, an entity having a pool of individual interpreters, or, for example, a wireless communication service provider (such as Verizon®, Sprint®, T-Mobile®, AT&T®, etc.) that employs a pool of interpreters or which contracts with individuals or entities for interpretation services.

As part of the preferred registration process, person A's hands-free communicator 20 is activated by assigning a unique identifier to the hands-free communicator and associating that unique identifier with person A. This unique identifier is preferably a factory-set electronic serial number (ESN) that is transmitted whenever the hands-free communicator initiates a call to the provider 100 thereby permitting the provider 100 to track usage of the system by person A. The step of registering the hands-free communicator 20 may be accomplished by person A contacting the provider telephonically to provide the ESN and other relevant subscriber information such as person A's name, billing address, etc. Additionally, person A may enter the ESN and relevant billing information through an interactive website.

In addition, as part of the registration process, the hands-free communicator 20 may be preprogrammed to call a specific provider 100 based on person A's state or country of residence or present location. Also, as part of the registration process the unique identifier may be associated with person A's designated language L1 to more quickly identify and assign an individual interpreter upon receipt of a call from person A requesting interpretation services.

Initiation Protocol:

After the initial registration, use of the system 10 is accomplished by commencing an initiation protocol. The initiation protocol preferably includes person A actuating the call connect feature via the user interface 26. In a preferred embodiment, the call connect/disconnect feature 32 of the user interface 26 is preferably a one-touch push-button or the like, that, when actuated, automatically calls the provider 100 and/or terminates the call to the provider 100. As previously discussed, rather than a push button, the call connect/disconnect feature 32 may instead be actuated by voice or by some other contact or contactless switch or sensor, whereby upon actuation, a signal is caused to be sent over the WPAN established by the communication of the WPAN transceivers of the 2-way RF device 12 and the hands-free communicator 20. This signal from the hands-free communicator 20 causes the 2-way RF device 12 to dial and/or call the interpreter as preferably preprogrammed during the registration process or as automatically determined or routed as previously described. The above-described feature is hereinafter referred to as "one-step actuation" or a "one-step call" feature.

Upon receiving the call, the interpreter 100 preferably recites a greeting in language L1 to let person A know that the call has been answered and that an interpreter 100 is connected. To complete the initiation protocol, person A identifies the languages L2 for which interpretation services are required. If person A does not know the language being spoken for which he/she desires interpretation, a preferred system would enable person A to request a linguist to assist in identifying the language. Once the language is identified, an appropriate interpreter 100 may be connected to the call.

In the preferred embodiment, the initiation protocol also preferably identifies to the interpreter 100 in what mode (as described below) the system is to be used (e.g., Two-Way Proximity Communication Mode 200, Observation Mode 300 or Two-Way Remote Communication Mode 400), so that the interpreter 100 knows whether or not to wait for verbal communication from person A, or whether the interpreter 100 will simply be repeating communications from persons B and C, for example. It should be appreciated that the identification of language L2 to the interpreter 100 may have been previously specified or pre-arranged by person A prior to person A actually approaching person B (as in the Two-Way Proximity Communication Mode 200) or before person A is in position to begin intercepting communications between two foreign language speakers (as in the Observation Mode 300), in which event, the initiation protocol is complete upon the interpreter 100 indicating he/she is connected and ready to begin interpretation services.

Figure 6:
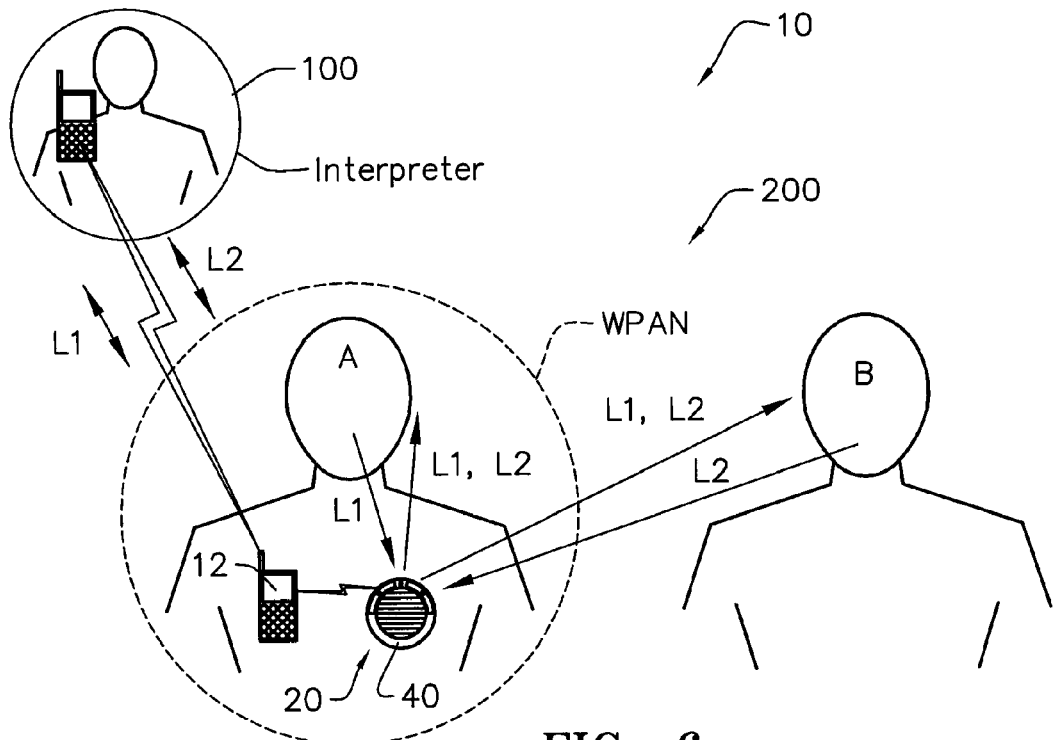
FIG. 6 schematically illustrates the mode of FIG. 1 wherein the embodiment of the pendant style hands-free communicator of FIG. 4 is being used.
Figure 7:
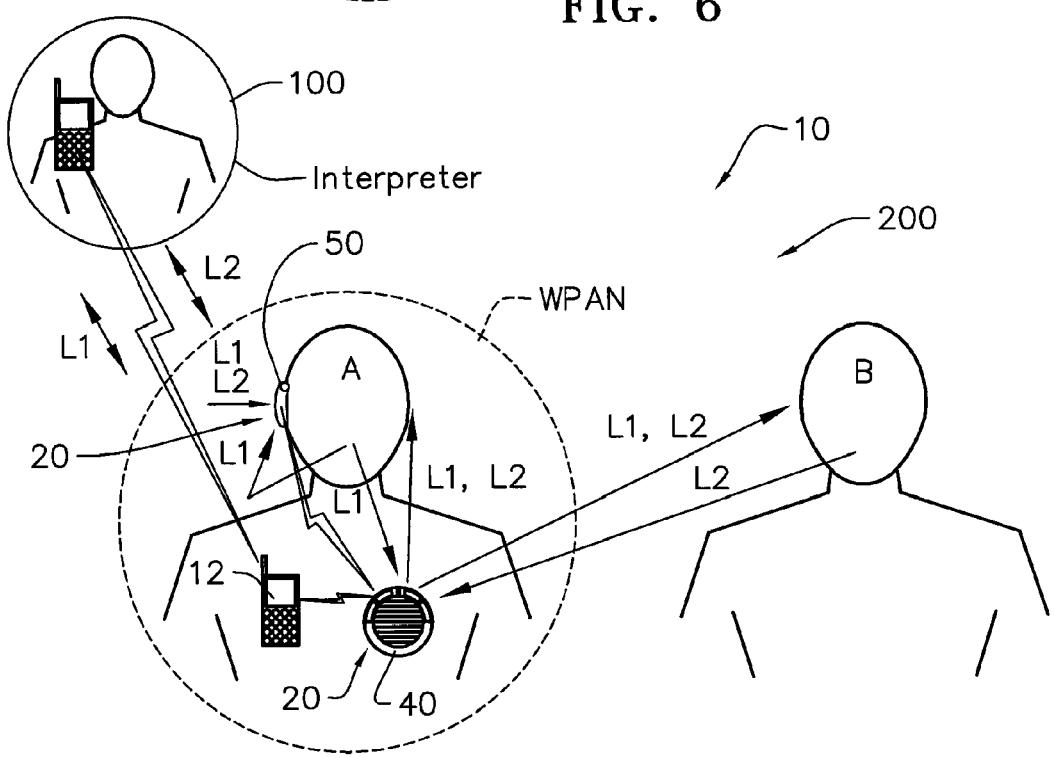
FIG. 7 schematically illustrates the mode of FIG. 1 wherein the embodiment of the hands-free communicator comprising the combination of the pendant of FIG. 4 and the headset of FIG. 5 are being used.

Two-Way Proximity Communication Mode:

FIGS. 1, 6 and 7 schematically illustrate embodiments in which the system and method 10 is used to facilitate two-way communication in which person A, speaking language L1, desires to communicate with person B speaking language L2, and wherein persons A and B are in close proximity to one another. Thus, this embodiment is hereinafter referred to as the "Two-Way Proximity Communication Mode 200."

The Two-Way Proximity Communication Mode 200 is particularly suited for travelers wishing to communicate with locals in their native or foreign language. Another application particularly suited for this Mode 200 is for law enforcement or medical personal having to interact with people that may not speak their language. Still another application particularly suited for this Mode 200 is for employers needing to speak with employees who may not speak the same language.

For purposes of describing use of the system and method 10 in the connection with the Two-Way Proximity Communication Mode 200, it is presumed that person A has previously completed the initial registration. Accordingly, as person A approaches person B, person A may begin the initiation protocol as previously described such that upon approaching person B, person A speaks aloud in language L1 the question or statement that person A desires to be repeated in language L2 to person B. Person A's statement in L1 is received by the hands-free communicator 20 and is transmitted over the WPAN to the 2-way RF device 12 which, in turn, transmits the statement to the interpreter 100 via RF-communication. The interpreter 100 repeats person A's statement in language L2 into the interpreter's telephone or other RF-communication device. The interpreter's words in Language L2 are transmitted via RF-communication back to person A's 2-way RF device 12, which, in turn, transmits the interpreter's words to the hands-free communicator 20 where the words are broadcast through the speaker 22 to person B. The interpreter 100 then waits for person B's response. Person B responds in language L2. The response is received through the microphone 24 of the hands-free communicator 20. The response is transmitted by the hands-free communicator 20 over the WPAN and to the interpreter 100 over the wireless phone 12 via RF-communication as before. The interpreter 100 repeats person B's response in language L1 and the interpreter's words are transmitted back to the 2-way RF device 12 and hands-free communicator 20 where the interpreters words in language L1 are broadcast to person A through the speaker 22. This back-and-forth communication with the interpreter 100 continues until termination of the call by person A actuating the call disconnect.

Figure 8:
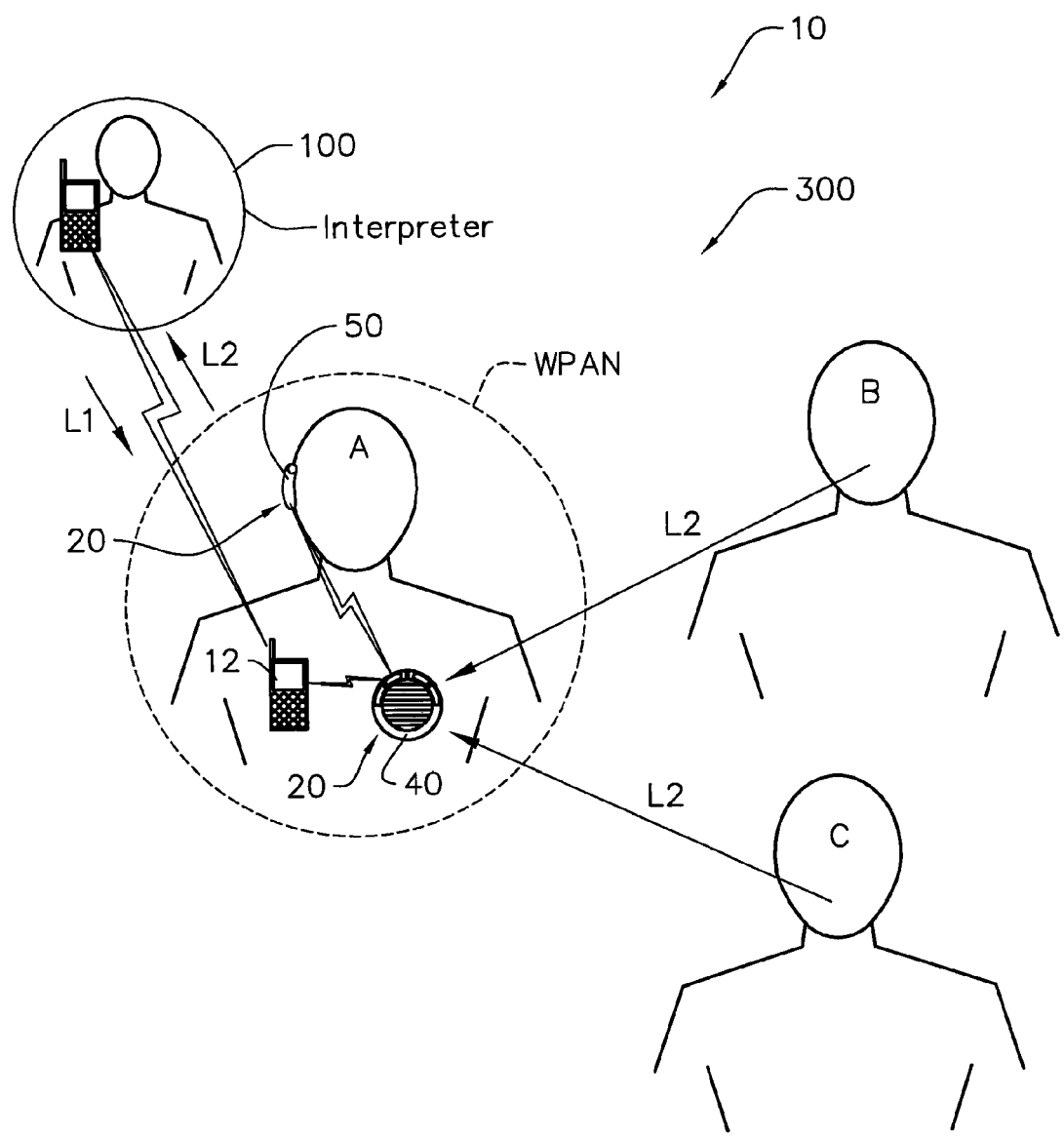
FIG. 8 schematically illustrates the mode of FIG. 2 wherein the embodiment of the hands-free communicator comprising the combination of the pendant of FIG. 4 and the headset of FIG. 5 are being used.
Figure 9:
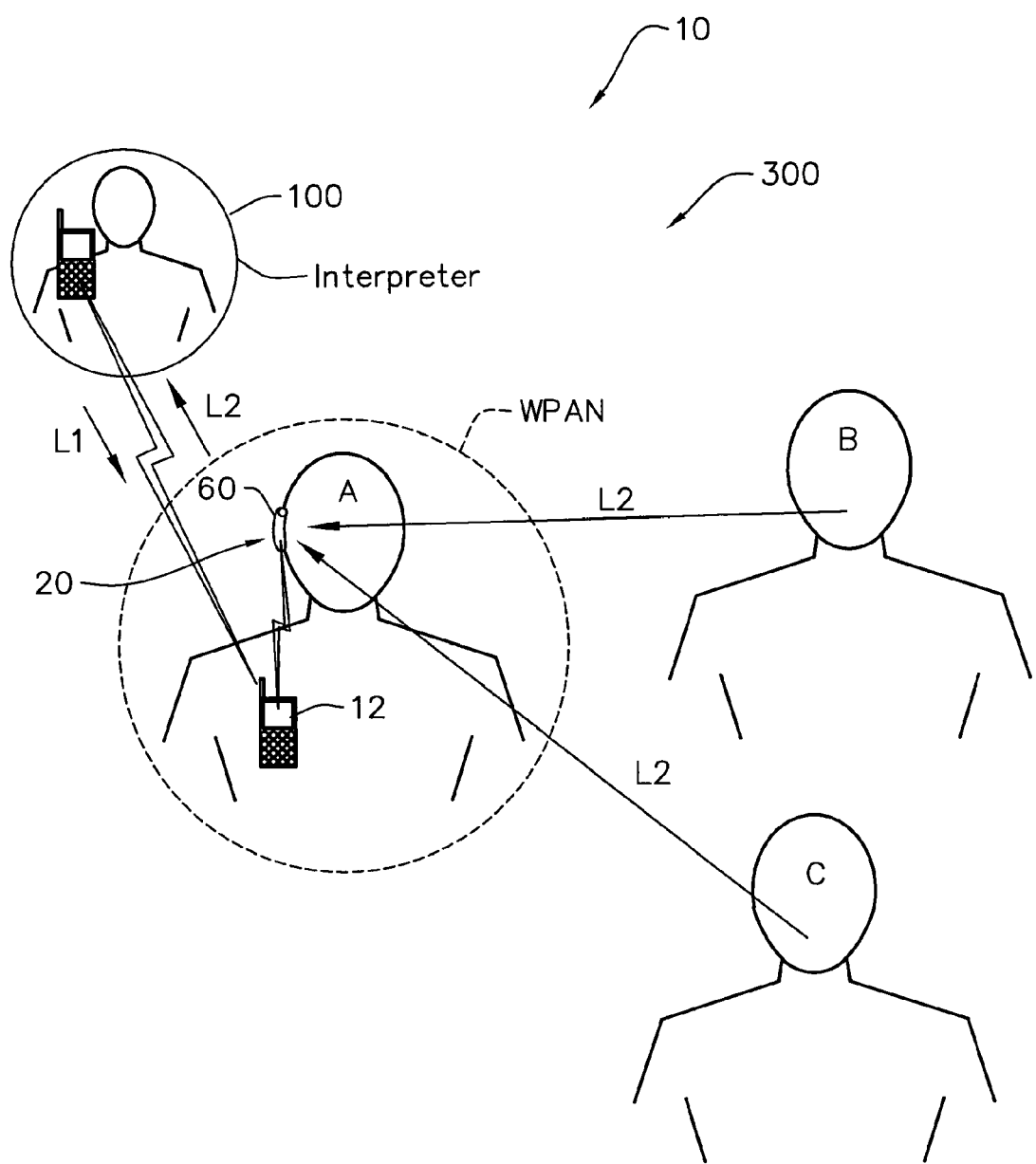
FIG. 9 schematically illustrates the mode of FIG. 2 wherein the embodiment of the headset style hands-free communicator of FIG. 5 is being used.

Observation Mode:

FIGS. 2, 8 and 9 schematically illustrate an embodiment in which the system and method 10 is used to enable person A, speaking language L1, to listen in on, and understand communications between persons B and C speaking language L2 without person B's and/or person C's knowledge. This mode or embodiment is hereinafter referred to as the "Observation Mode 300." The Observation Mode 300 is particularly suitable for covert situations, such as, for example, when a military scout is positioned to observe foreign combatants who speak a different language. Another application for which the Observation Mode 300 is particularly suited is when a law enforcement agent desires to listen in on a conversation between foreign speaking persons who may be plotting a terrorist attack or some other unlawful activity.

For purposes of describing use of the system and method 10 in the connection with the Observation Mode 300, it is presumed that person A has previously completed the initial registration. Additionally, it is also presumed that person A has previously identified to the interpreter 100 the mode of operation of the system will be in the Observation Mode 300 such that upon person A actuating the call connect feature of the initiation protocol upon approaching person B and C, the interpreter 100 will simply begin providing interpretation services without waiting for person A to speak. It is also presumed that person A is wearing a headset 50 which cooperates with the pendant style hands-free communicator 40, or, alternatively, person A is wearing a headset 60 that is itself the hands-free communicator 20 as previously described.

Thus, the process or method for the Observation Mode 300 is substantially the same as described for the Two-Way Proximity Communication Mode 200, except that rather than person A speaking, person A remains silent and the interpreter 100 repeats only the verbal communications overheard through the microphone 24 between persons B and C. The interpreter 100 continues to provide interpretation services until termination of the call by person A actuating the call disconnect feature 32.

It should be appreciated that to prevent the interpreter's words from being heard by persons B and/or C, the external speaker 22 on the pendant style hands-free communicator 40 is muted and the interpreter's words are transmitted to the headset 50 worn by person A, such that only person A is able to hear the interpreter. It should also be appreciated that if person A is wearing the hands-free communicator headset 60 there may be no external speaker to mute.

Figure 10:
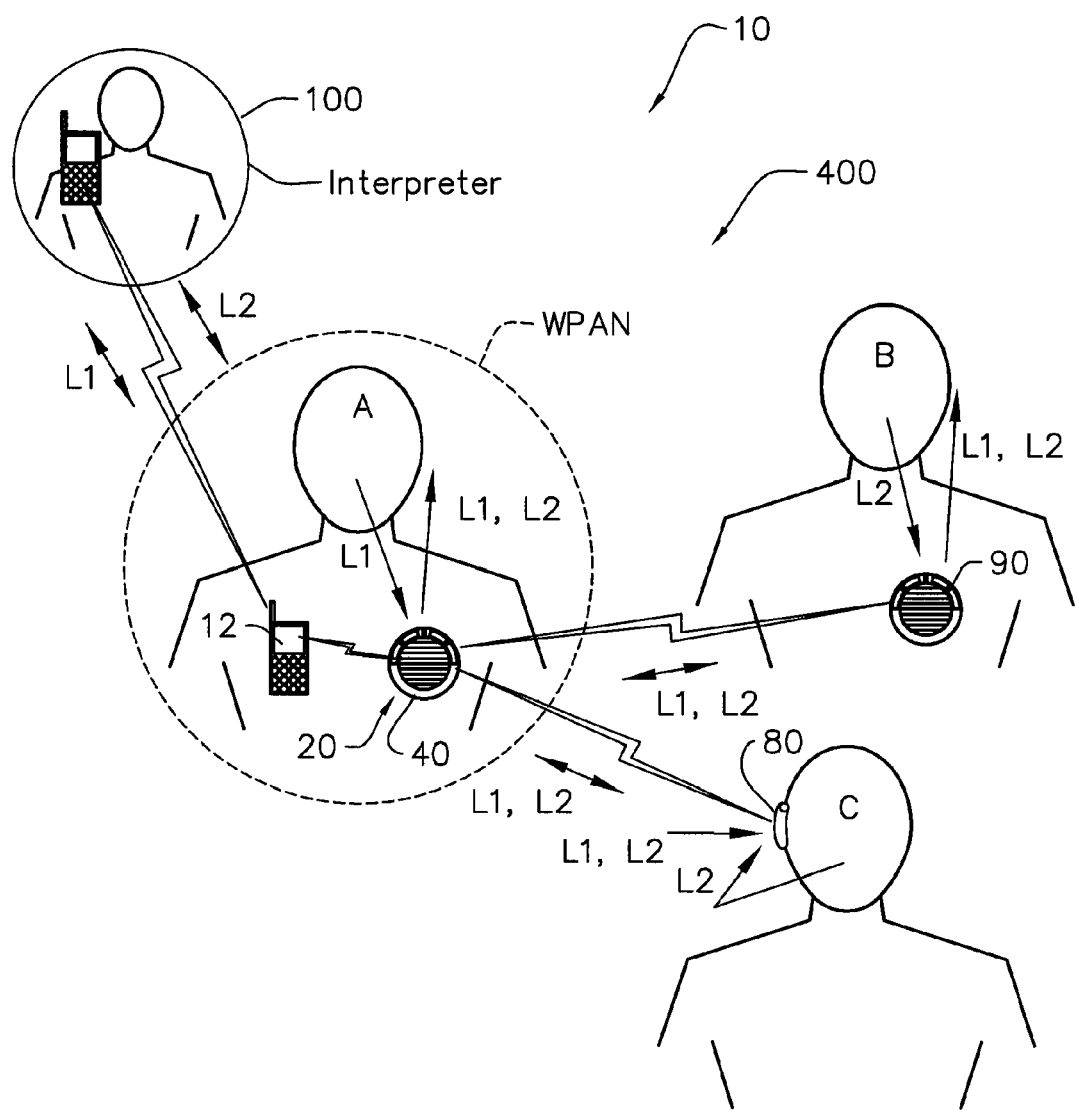
FIG. 10 schematically illustrates the mode of FIG. 3 wherein an embodiment of a remote user pendant of FIG. 4 is being used by person B and an embodiment of a remote user headset of FIG. 5 is being used by person C.

Two-Way Remote Communication Mode:

FIGS. 3 and 10 schematically illustrate an embodiment in which the system and method 10 is used to facilitate two-way communication in which person A, speaking language L1, desires to communicate with person B and/or person C who are sufficiently remote from person A such that they are unable to clearly hear the interpreter's words through the speaker 22 on the hands-free communicator 20 or where external noise prevents persons B and/or C from hearing the interpreter. This embodiment is hereinafter referred to as the "Two-Way Remote Communication Mode 400."

For purposes of describing use of the system and method 10 in the connection with the Two-Way Remote Communication Mode 400, it is presumed that person A has previously completed the initial registration. Accordingly, when person A desires to communicate with person B and/or C, person A begins the initiation protocol as previously described whereupon, person A speaks aloud in language L1 the question or statement that person A desires to be repeated in language L2 to persons B and/or C. It is also presumed that person A is wearing either a pendant style hands-free communicator 40 or a headset 50 which cooperates with the pendant style hands-free communicator 40. It is also presumed that persons B and C are wearing the remote user headsets 80.

The process or method for the Two-Way Remote Communication Mode 400 is substantially the same as described for the Two-Way Proximity Communication Mode 200, the only difference being that instead of or in addition to the interpreter's voice being broadcast over the speaker 22 of the pendant 40, the interpreter's voice is wirelessly communicated to the remote user headsets 80 so that persons B and C can hear the interpreter's voice at their remote locations.

Multiple Person A Listeners

It should be appreciated that, in a preferred system and method in each of the foregoing modes of operation (200, 300, 400), because the voice of person A, the voice of the interpreter 100 and the voices of persons B, C etc. are all being communicated through the system 10 via RF signals, anyone having a hands-free communicator 20 is able to listen in on the conversation. The ability to listen in on a conversation would be of benefit to police, firefighters, emergency medical personal, military personnel, etc. For example, in an emergency situation involving a foreign speaking victim, the first responder to the emergency may initiate the interpretation services in Two-Way Proximity Communication Mode 200 upon arriving at the scene. As other emergency personnel arrive later, they too will be able to hear the interpreted conversation between the first responder and the foreign speaking victim as soon as they enter the WPAN of the first responder.

In another example, if a military squad is positioned to covertly observe non-English speaking enemy personnel, the squad leader may initiate the interpretation services in Observation Mode 300 in order to listen to the interpreted speech of the enemy personnel. All the other members of the squad within the squad leader's WPAN will also be able to hear the interpreted speech of the enemy personnel.

The foregoing description is presented to enable one of ordinary skill in the art to make and use the invention, and is provided in the context of a patent application and its requirements. Various modifications to the preferred embodiment of the apparatus and the general principles and features of the system and methods described herein will be readily apparent to those of skill in the art. Thus, the present invention is not to be limited to the embodiments of the apparatus, system and methods described above and illustrated in the drawing figures, but is to be accorded the widest scope consistent with the spirit of this disclosure and the appended claims.

The invention claimed is:

1. A system for providing interpretation services between a first person speaking a first language and a second person speaking a second language, said system comprising:
    an interpretation service provider comprising a call center having an individual interpreter who speaks the first and second languages;
    a 2-way RF device;
    a first person and the 2-way RF device registered with the interpretation service provider, the 2-way RF device and the first person associated with a unique identifier;
    an initiation protocol, wherein interpretation services are requested by the first person using a one-step call feature of the 2-way RF device, which, when actuated, automatically calls the interpretation service provider and automatically transmits the unique identifier to the interpretation service provider thereby identifying both the first person and the 2-way RF device being used, and wherein the initiation protocol further includes communicating the first and second language for which interpretation services are requested to the interpretation service provider for directing the call to the individual interpreter who speaks the first and second languages;
    whereupon the individual interpreter is able to receive real-time, live voice communications from the first person and the second person via the 2-way RF device, and whereby the first person and the individual interpreter are in real-time, live voice communication in the first language, and the second person and the individual interpreter are in real-time, live voice communication in the second language.

2. The system of claim 1 wherein the first person is registered with the interpretation service provider through an Internet website accessible by the first person.

3. The system of claim 1 wherein the first language is associated with the first person when the first person is registered with the interpretation service provider.

4. The system of claim 1 wherein the one-step call feature comprises a call button preprogrammed to automatically call the interpretation service provider and to automatically communicate to the interpretation service provider the unique identifier and the first and second languages for which interpretation services are requested for purposes of routing the call to the individual interpreter who speaks the first and second languages.

5. The system of claim 1 wherein the first person identifies the first and second language for which interpretation services are requested prior to actuating the one-step call feature.

6. The system of claim 1 wherein the first person identifies the second language for which interpretation services are requested after actuating the one-step call feature.

7. The system of claim 1 wherein the 2-way RF device is preprogrammed to call the interpretation service provider based on the first person's residency.

8. The system of claim 1 wherein the 2-way RF device is preprogrammed to call the interpretation service provider based on the first person's present geographic location.

9. The system of claim 1 wherein the 2-way RF device cooperates with a hands-free communicator having a microphone, speaker and transceiver that wirelessly communicates with the 2-way RF device.

10. A method of receiving interpretation services by a first person speaking a first language and a second person speaking a second language, the method comprising:
    the first person registering with an interpretation service provider comprising a call center, the call center having an individual interpreter who speaks the first and second languages, wherein the step of registering includes associating a unique identifier with the first person and a 2-way RF device;
    the first person requesting interpretation services from the interpretation service provider using an initiation protocol, wherein said initiation protocol is commenced by the first person actuating a one-step call feature using the 2-way RF device, which, when actuated, automatically calls the interpretation service provider and automatically transmits the unique identifier thereby identifying both the first person and the 2-way RF device, and further wherein the one-step call feature communicates the first and second languages for which interpretation services are requested to the interpretation service provider;
    whereupon the individual interpreter is able to receive real-time, live voice communications from the first person and the second person via the 2-way RF device, and whereby the first person and the individual interpreter are in real-time, live voice communication in the first language and whereby the second person and the individual interpreter are in real-time, live voice communication in the second language.

11. The method of claim 10 wherein the first person registers with the interpretation service provider through an Internet website accessible by the first person.

12. The method of claim 10 wherein the first language is associated with the first person when the first person registers with the interpretation service provider.

13. The method of claim 10 wherein the one-step call feature comprises a call button preprogrammed to automatically call the interpretation service provider and to automatically communicate to the interpretation service provider the unique identifier and the first and second languages for which interpretation services are requested for purposes of routing the call to the individual interpreter who speaks the first and second languages.

14. The method of claim 10 wherein the first person identifies the first and second language for which interpretation services are requested prior to actuating the one-step call feature.

15. The method of claim 10 wherein the first person identifies the second language for which interpretation services are requested after actuating the one-step call feature.

16. The method of claim 10 wherein the 2-way RF device is preprogrammed to call the interpretation service provider based on the first person's residency.

17. The method of claim 10 wherein the 2-way RF device is preprogrammed to call the interpretation service provider based on the first person's present geographic location.

18. The method of claim 10 wherein the 2-way RF device cooperates with a hands-free communicator having a microphone, speaker and transceiver that wirelessly communicates with the 2-way RF device.

19. A method for providing mobile language interpretation between a first person speaking a first language and a second person speaking a second language, the method comprising:
    registering the first person with an interpretation service provider comprising a call center, the call center having an individual interpreter who speaks the first and second language, the step of registering including, associating a unique identifier with the first person and a 2-way RF device having a one-step call feature to be used by the first person for requesting the interpretation services;
    receiving an initiation protocol initiated via the one-step call feature, the initiation protocol automatically transmitting the unique identifier thereby identifying both the first person and the 2-way RF device, the initiation protocol further comprising identification of the first and second languages for which interpretation services are requested;
    connecting to the call, the individual interpreter who speaks the first and second language, whereby the first person, the second person and the individual interpreter are all in real-time, live voice communication with one another via the 2-way RF device, the first person and the interpreter in real-time, live voice communication in the first language, the second person and the interpreter in real-time, live voice communication in the second language.

20. The method of claim 19 wherein the first person is registered via an Internet website.

21. The method of claim 19 wherein the step of registering includes associating the first language with the first person.

22. The method of claim 19 wherein the initiation protocol is commenced via a one-step call feature which is configured to automatically call the interpretation service provider and to automatically communicate to the interpretation service provider the unique identifier and the first and second languages for which interpretation services are requested for purposes of routing the call to the individual interpreter who speaks the first and second languages.

23. The method of claim 19 wherein the 2-way RF device is preprogrammed to call the interpretation service provider based on the first person's residency.

24. The method of claim 19 wherein the 2-way RF device is preprogrammed to call the interpretation service provider based on the first person's present geographic location.

25. The method of claim 19 wherein the 2-way RF device cooperates with a hands-free communicator having a microphone, speaker and transceiver that wirelessly communicates with the 2-way RF device.

* * * * *